(12) United States Patent
Patterson et al.

(10) Patent No.: US 8,316,809 B1
(45) Date of Patent: Nov. 27, 2012

(54) TWO-MODE VALVE ACTUATOR SYSTEM FOR A DIESEL ENGINE

(75) Inventors: Donald James Patterson, Ann Arbor, MI (US); Kevin Michael Morrison, Ann Arbor, MI (US); George Byron Schwartz, Canton, MI (US)

(73) Assignee: Electro-Mechanical Associates, Inc., Ann Arbor, MI (US)

( * ) Notice: Subject to any disclaimer, the term of this patent is extended or adjusted under 35 U.S.C. 154(b) by 73 days.

(21) Appl. No.: 13/041,266

(22) Filed: Mar. 4, 2011

Related U.S. Application Data

(60) Provisional application No. 61/339,462, filed on Mar. 4, 2010.

(51) Int. Cl.
*F01L 1/46* (2006.01)

(52) U.S. Cl. ............. 123/179.16; 123/90.16; 123/90.55; 123/198 F

(58) Field of Classification Search ............. 123/179.16, 123/90.12, 90.16, 90.17, 90.2, 90.21, 90.34, 123/90.39, 90.43, 90.44, 90.45, 90.65, 320, 123/321, 345–348, 198 F, 90.55
See application file for complete search history.

(56) References Cited

U.S. PATENT DOCUMENTS

| | | | | |
|---|---|---|---|---|
| 2,769,434 | A * | 11/1956 | Witzky | 123/54.7 |
| 4,054,109 | A | 10/1977 | Herrin et al. | |
| 5,692,464 | A | 12/1997 | Kimura | |
| 6,513,470 | B1 * | 2/2003 | Hendriksma et al. | 123/90.16 |
| 6,668,776 | B2 * | 12/2003 | Hendriksma et al. | 123/90.16 |
| 6,814,040 | B2 * | 11/2004 | Hendriksma et al. | 123/90.59 |
| 6,866,014 | B2 * | 3/2005 | Spath | 123/90.5 |
| 7,007,651 | B2 * | 3/2006 | Spath | 123/90.5 |
| 7,104,232 | B2 * | 9/2006 | Hendriksma et al. | 123/90.48 |
| 7,156,062 | B2 | 1/2007 | Vanderpoel | |
| 7,296,548 | B2 * | 11/2007 | Hendriksma et al. | 123/90.48 |
| 7,308,879 | B2 * | 12/2007 | Hendriksma et al. | 123/90.48 |
| 7,395,792 | B2 | 7/2008 | Hendriksma et al. | |
| 7,757,648 | B2 * | 7/2010 | Hendriksma et al. | 123/90.59 |

OTHER PUBLICATIONS

S. Hara, et. al., "Application of a Valve Lift and Timing Control System to an Automotive Engine," SAE Paper 890681, 1989.

(Continued)

*Primary Examiner* — Hai Huynh
(74) *Attorney, Agent, or Firm* — Jelic Patent Services, LLC; Stanley E. Jelic

(57) ABSTRACT

A two mode valve lifter for Diesel engines which varies the compression ratio between higher for cold starting and other selected operating conditions, and lower for warmed-up running. This is accomplished during engine starting and selected other conditions by causing the intake valve to close early (near bottom center), providing for example, up to three ratios additional compression. The invention incorporates a conventional valve lifter packaged within a sleeve, the sleeve being moved by the engine cam. In its conventional operating mode, the sleeve is rigidly attached to the lifter and the cam moves the assembly to lift the valve in the ordinary manner. When the sleeve is not attached, partial lost motion occurs, causing the valve to open later and close earlier. In the modified mode and as needed, optional damping can be introduced to allow the valve to open and close gradually and quietly. Similarly, a two mode valve lifter which retains additional exhaust gas in the cylinder to assist cold starting and warm-up by closing the exhaust valve earlier can be incorporated either alone or in combination with the intake two mode lifter.

16 Claims, 5 Drawing Sheets

OTHER PUBLICATIONS

H. Nakamura, et. al., Development of Gear Parts for VVT Unit, SAE Paper 970337 and SP-1258, 1977.
T. Leone, et. al. "Comparison of Variable Camshaft Timing Strategies at Part Load," SAE Paper 960584 and SP 1171, 1996.
Herrin and Pozniak, "A Lost-Motion, Variable-Valve-Timing System for Automotive Piston Engines," SAE Paper 840335, 1984.
Nelson and Elrod, "Continuous Camlobe Phasing," Automotive Engineering, v.95, No. 6, Jun. 1987.
Phillips Industrial Electronics Company, "Electronic Valve Timing," Automotive Engineering, vol. 99, No. 4, Apr. 1991.
Palma, The HCCI Concept and Control, Performed with MultiAir Technology on Gasoline Engines, SAE Paper 2011-24-0026, 2011.

* cited by examiner

TWO-MODE VALVE ACTUATOR SYSTEM FOR A DIESEL ENGINE

CROSS-REFERENCE TO RELATED APPLICATIONS

This application claims priority to and the benefit of U.S. Provisional Application 61/339,462 filed Mar. 4, 2010, which is herein incorporated by reference in its entirety.

FIELD OF THE INVENTION

The present disclosure is in the technical field of Diesel engines. More particularly, the present disclosure focuses on Diesel engine valve lifters.

BACKGROUND OF THE INVENTION

Diesel engines are widely used in commercial and military vehicles, as well as some light duty vehicles. The design compression ratio is a compromise between power, economy, emissions, and cold startability. The optimum ratio for best economy is near 14:1 to 15:1, whereas the necessary compression ratio for cold starting ranges from 16:1 to 23:1 depending on the specific design of the engine and its application. The cold starting ranges are too high for best economy, lowest emissions, and optimum power boost.

BRIEF SUMMARY OF THE INVENTION

The present disclosure provides a two-mode valve actuator system (TVA) for allowing lower designed compression ratio of automotive and heavy duty Diesel engines, while maintaining startability under cold starting conditions. Lowering the designed compression ratio improves fuel economy, reduces emissions, and allows increased power boost but at the expense of cold startability. The TVA then improves cold startability by briefly raising the effective compression ratio as well as retaining heat and some unburned fuel from going out the exhaust during starting. In one embodiment, means for damping mitigates any objectionable noise and vibration resulting from the TVA.

The two-mode valve actuator system for reducing valve lift and closing the valve at an earlier crank angle of a Diesel engine during cold starting and warm-up conditions, comprises: a partially disabling lifter which is supported in the engine block or cylinder head; and means to provide soft opening of the engine valve that the partially disabling lifter actuates. In a separate embodiment, the system further comprises means to dampen the closing of the engine valve that the partially disabling lifter actuates.

The partially disabling lifter comprises: a roller or flat follower which is actuated by a cam lobe of the engine; a lifter body which is functionally attached to the roller or flat follower; a plunger assembly; means to functionally allow telescoping motion between the lifter body and the plunger assembly, reduce valve lift, and close the valve at an earlier crank angle during engine cold starting and warm-up conditions; a pushrod seat assembly which is functionally attached to the plunger assembly and the lifter body; a spring seat which is functionally attached to the lifter body; a spring tower which is functionally attached to the plunger assembly; a seat assembly which is functionally attached to the lifter body of the Diesel engine, wherein the Diesel engine is a pushrod engine, or a solid surface on top of the spring tower which is functionally attached to a Diesel engine rocker, wherein the Diesel engine is a non-pushrod engine; and a lost motion spring which is functionally attached to the spring tower.

Means to functionally allow telescoping motion between the lifter body and the plunger assembly, reduce valve lift, and close the valve at an earlier crank angle during engine cold starting and warm-up conditions can be a pins, magnetic latching, thermal expansion, or the like.

Means to provide soft opening of the engine valve that the partially disabling lifter actuates comprises an element to provide soft opening of the valve which is actuated by the corresponding partially disabling lifter.

Means to dampen the closing of the engine valve that the partially disabling lifter actuates comprises a damper.

The TVA does not disable the lifter totally, but provides partial lost motion which causes the valve to open later and close earlier with reduced lift. The TVA partially disables the valve lifter under conditions such as starting and other selected conditions when needed. The purpose is to cause the valve to open and close, at the selected conditions, at crank angles that are more optimal for the particular engine speed and load. For an intake valve, the optimal closing crank angle range during cold start is from bottom center piston position to about 15 degrees after bottom center. For the exhaust valve, the optimal closing crank angle during cold start is about 10 to 20 degrees before top center. Optional damping controls the initial opening and final closing of the valve to minimize objectionable noise or vibration.

By varying the intake valve timing, the present invention changes the effective compression ratio without any change to the combustion chamber and thus an optimized engine remains optimized for performance, economy, and emissions regardless of which of the two modes is selected. By varying the exhaust valve timing, the present invention changes the amount of exhaust gases that are retained within the cylinder, thereby further improving cold starting and facilitating engine warm-up.

The purpose of the present invention is to provide a new Diesel engine intake and/or exhaust valve actuation device that has novel features not offered by the prior art. This results in a new means of selectively changing the engine effective compression ratio and/or partially retaining unburned exhaust gas to hasten engine warm-up, a device which is not apparent, obvious, or suggested, either directly or indirectly by any of the prior art apparatus.

The present invention incorporates a traditional valve lifter that is packaged within a sleeve which is moved by the cam. In its present use form, this type of lifter is sometimes referred to as a disabling lifter and is, for example, part of the Displacement on Demand (DOD) system that General Motors (GM) incorporates into some production spark-ignition engines. In such a lifter, the sleeve is moved by the cam. In its normal operating mode, the sleeve is attached to the lifter and the cam moves the assembly to lift the valve in the ordinary manner. When the sleeve is not attached, total lost motion occurs and the engine poppet valve does not open. In the present invention, the DOD type lifter is modified to produce partial lost motion. The cam does lift the valve, but the lift starts later and ends earlier. The purpose is to provide an effective compression ratio up to as high as the engine design compression ratio by closing the intake valve when the piston is near bottom dead center and or to increase the exhaust gases retained in the cylinder by closing the exhaust valve earlier. This reduced valve actuation is expected to produce noise because the soft opening and soft closing ramps of the cam are bypassed. To correct the noise problem, if needed, an optional damper provides the slow opening and closing of the valve normally provided by these ramps on the cam.

The two mode valve actuator (TVA) system uses a partially disabling lifter which is deactivated during cold starting and perhaps other selected light load, low speed running. Once the engine is running properly, the valve lifter is returned to normal operation by locking the sleeve and lifter together. A pin is postulated as a means to lock the conventional lifter and sleeve together (like the GM DOD lifter), although other means such as magnetic latching or thermal expansion could be used. A passive bi-metal spring could activate the locking mechanism as the engine warms-up. However, a computer controlled activation means such as an oil pressure change or electro-magnetic activation could also be used. To complete the TVA package, the design compression ratio of the engine is then lowered, thus improving fuel economy (perhaps 6% or more) and also permitting an intake air pressure boost increase. Moreover $CO_2$ emission and typically smoke and hydrocarbon emission are lowered when using this method. These benefits of reduced compression ratio are well known to Diesel engine engineers.

When activated the TVA provides reduced valve lift. Lower intake valve lift does not reduce the amount of air in the cylinder under the low speed conditions where it is employed. In fact, increased air in the cylinder occurs because of the early intake valve closing. Lower exhaust valve lift causes more unburned exhaust to be retained in the cylinder. Together with early exhaust valve closing, this further assists cold engine starting and warm-up.

Closing the valves at earlier crank angles produces benefits such as increasing the effective compression ratio and mass of ingested gas when the TVA is applied to the intake valve, and warming the cylinder and increasing the mass of retained exhaust gases when applied to the exhaust valve. Used individually or together, the intake and exhaust TVA's not only improve cold starting, warm-up, and the attendant hydrocarbon and soot emissions, but facilitates use of the Miller Cycle for improved fuel economy during warmed-up operation.

Once the engine is warmed-up and running properly, the cam operates the valve normally which may be as much as 99% of the time. Minimal or no engine block or head modifications are needed and thus the two mode lifter is not only suitable for new engines but also may be suitable for retrofitting older engines.

The TVA works with lifters that incorporate a hydraulic lash adjustment feature or use some other method of lash adjustment such as an adjustable screw or shims of different thickness.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION OF THE INVENTION

Since the design compression ratio for automotive and heavy duty Diesel engines of 16:1 up to 23:1 is for starting conditions, sacrifices are made with regards to warm engine fuel economy, emissions, and optimum power boost. The optimal compression ratio for a warm engine may be as low as 15:1 and in some embodiments even lower. Hence, there exists a need to enable reduced automotive and heavy duty Diesel engine compression ratios, after the engine has been warmed-up.

Figure 2:
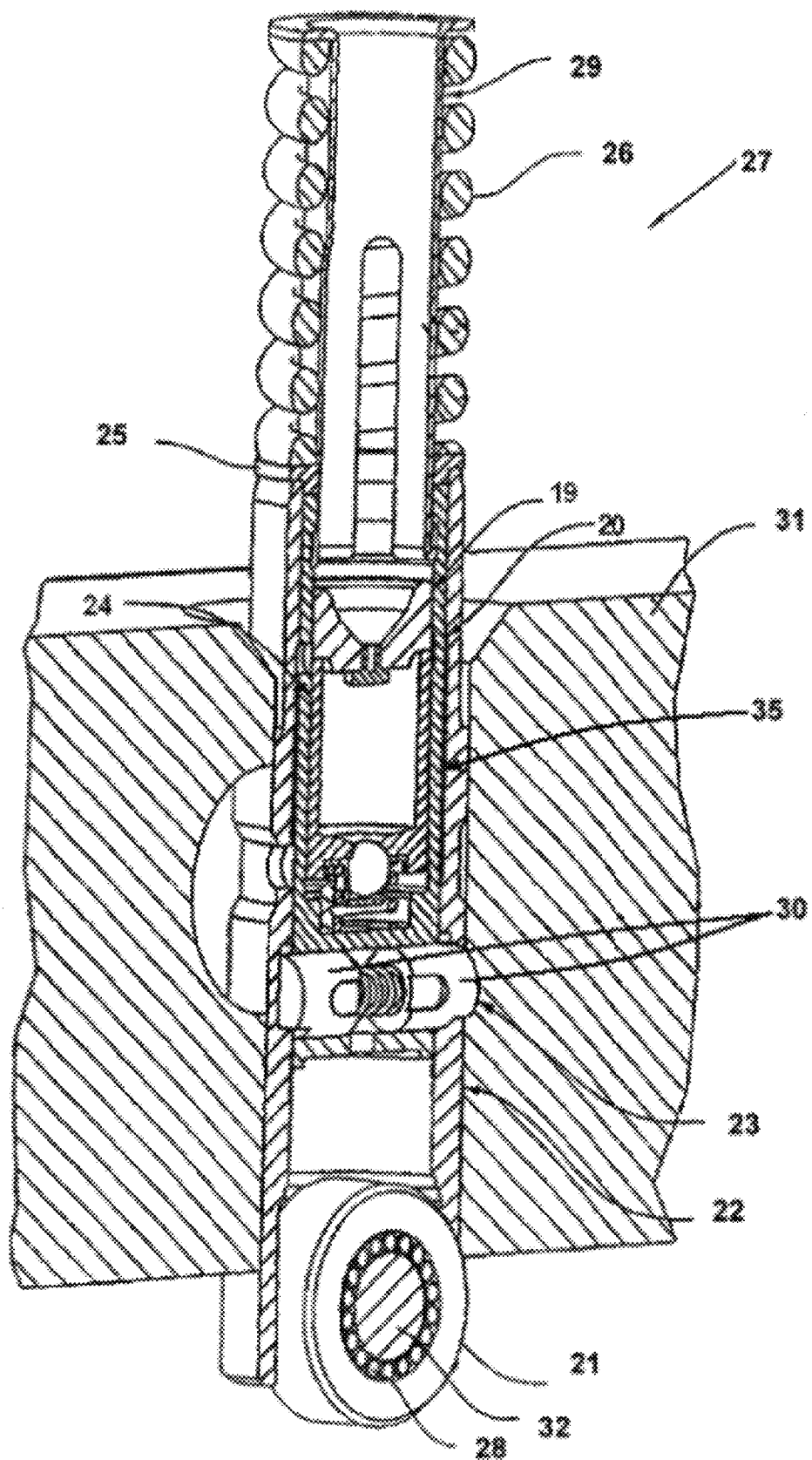
FIG. 2 is a perspective view of a commercial, production valve lifter similar to the General Motors Displacement on Demand disabling lifter which when modified is a component of the TVA system.

Devices have been proposed for adjusting the valve timing of piston engines. Some are in production for spark-ignited engines. The inventors are not aware of two mode valve actuator devices applied to the Diesel engine, and in particular which are based around a combination of both partly deactivating the valve lifter and optionally damping the modified lifter motion under selected conditions such as starting. A number of patents for Spark-Ignited (SI) engines that are based upon two mode valve lifter action have been issued to Delphi and General Motors (GM). These patents form the basis of the design for the GM Displacement On Demand (DOD) production engine system. In these patents a two-step invention is shown which either disables the valve completely or allows the valve to operate normally. FIG. 2 in this application is a figure from Delphi Patent by Hendriksma et. al. Number U.S. Pat. No. 7,395,792 B2. The discussion of that figure is intended to educate the reader about the operation of a conventional DOD lifter in order to form the basis for the lifter modifications discussed in connection with FIG. 3 and FIG. 4. The modified DOD type of lifter is a component of the Two Mode Valve Actuation System (TVA).

The content of U.S. Pat. No. 7,395,792 B2 is herein incorporated by reference in its entirety.

Variable valve lifting means have not been applied to the Diesel, as far as the inventors know, because of interference between the piston crown and valves if the cam timing itself is changed. Also most mechanisms that vary the compression ratio are not useful for Diesel engines because of changes to the combustion chamber shape and thus to the combustion itself. The Diesel engine is not tolerant of changes to the combustion system in an otherwise optimized engine.

It is a common practice to close the intake valve more than 60 crank angle degrees after the piston reaches bottom dead center. This is to enhance high speed engine power. But, this late closing reduces the effective compression ratio by 2 or 3 ratios depending on the intake valve closing angle. For example, a design ratio of 18:1 is needed to provide a suitable effective ratio of 15:1 because of late intake valve closing.

Hence, the combustion chamber design must be compromised to compensate for compression ratio loss.

To compensate for the above effect, the present disclosure discusses a valve lifter mechanism which can operate in either of two modes, normal valve lift, or modified valve lift. This means that the combustion chamber design is optimized for fuel economy and emissions for normal running, but then the compression ratio is effectively raised via the TVA system, when required, to be suitable for cold starting and warm-up, without affecting the geometry and performance of the combustion chamber.

A principal object of the present invention is to provide a means to lower the design compression ratio of the Diesel engine that will not diminish cold startability and provide the ability to control valve train noise.

An object of the present invention is to provide a two mode valve lifter device that provides a higher compression ratio for starting the engine, but a lower ratio for normal running.

Another object of the present invention is to provide two levels of compression ratio as a means to increase the fuel economy of the Diesel engine without sacrificing cold startability or creating excess noise and vibration.

Another object of the present invention is to allow the engine to operate at a lower compression ratio during warmed-up operation thus reducing engine-out $CO_2$ emission as well as soot and HC emission without sacrificing cold startability.

Another object of the present invention is to improve fuel economy by allowing the use of the Miller Cycle which uses late intake valve closing during warmed-up engine operation without the loss of cold start or warm-up capability created by the reduced effective compression ratio inherent with the Miller Cycle.

Another object of the present invention is to provide two levels of effective compression ratio as a means to increase the power boost of the Diesel engine when operating at the lower compression ratio without sacrificing cold startability.

Another object of the present invention is to provide a two mode valve lifter device that can be incorporated into a Diesel engine without significant redesign of the engine structure.

Another object of the present invention is to provide a two mode valve lifter device that can be retrofit into an existing Diesel engine design without significant modification to the engine.

Another object of the present invention is to provide a means for switching a two mode valve lifter from early intake valve closing for cold start and light load running to normal valve closing for other speeds and loads.

Another object of the present invention is to provide a two mode valve lifter device that retains controlled amounts of exhaust gases in the cylinder to facilitate cold starting and cold drive-away.

Another object of the present invention is to suggest key parameters for a control strategy for selecting the operating mode of a two mode valve lifter with optional damping.

Another object of the present invention is to provide a two mode valve lifter device that is more universally functional in today's market than the prior art devices.

It is intended that any other advantages and objects of the present invention that become apparent or obvious from the detailed description or illustrations contained herein are within the scope of the present invention.

Figure 1:
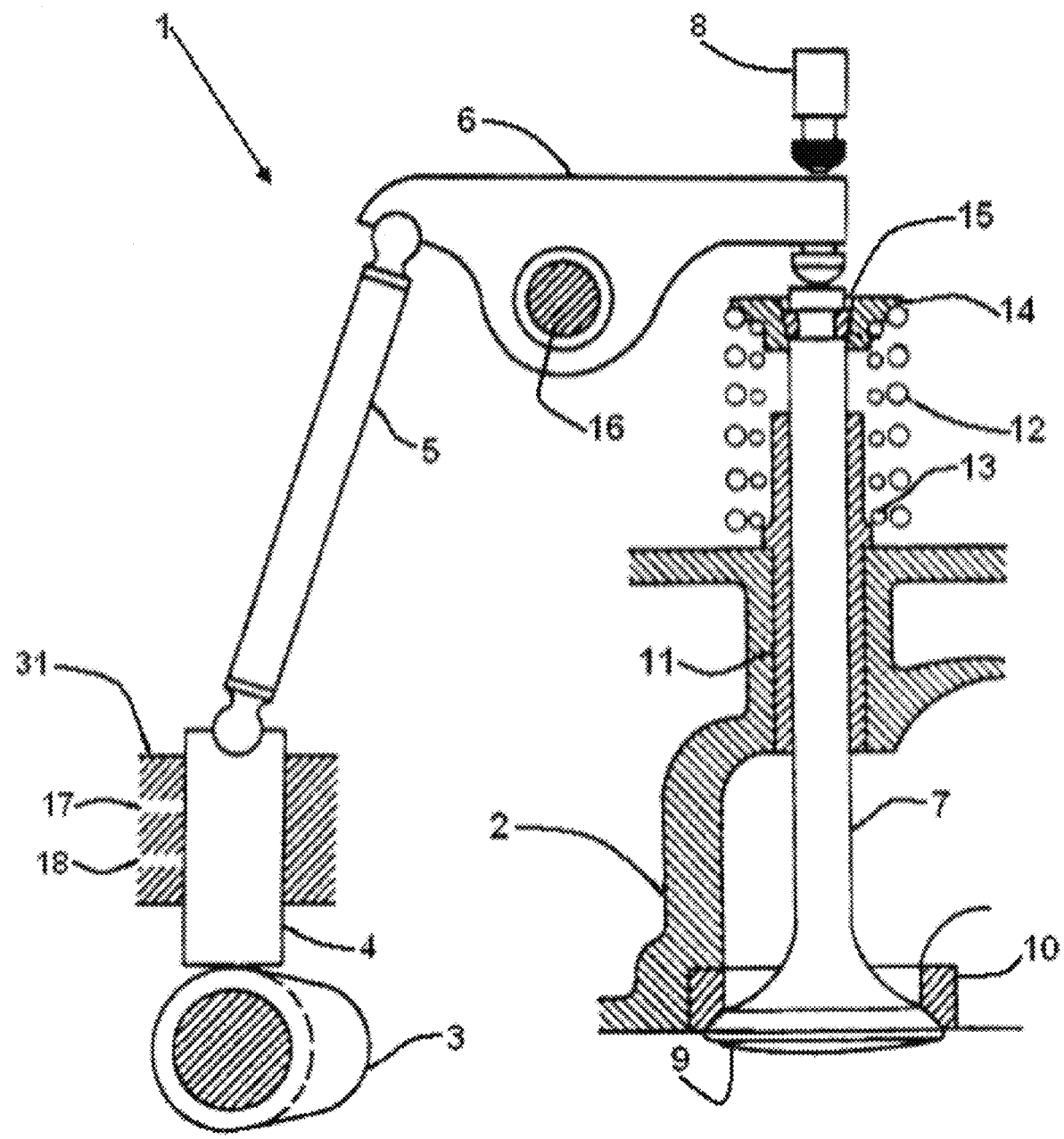
FIG. 1 is an overall view of the TVA system applied to an intake valve of a pushrod engine. It includes disabling type hydraulic valve lifter and optional damping.

FIG. 1 illustrates a conventional valve train modified to include the TVA components 1. The conventional system consists of a cam 3 which bears on the lifter 4 which in turn bears on the pushrod 5. When moved, the pushrod 5 causes the rocker arm 6 to rotate about pivot 16, thus moving the valve 7. Valve 7 consists of stem connected to valve head 9 and seats on the valve seat insert 10 which is inserted into cylinder head 2. The valve 7 is supported in the valve guide insert 11. The inner spring 13 and outer spring 12 preload the valve, thus keeping it tightly closed unless lifted by the cam 3. The springs are constrained by the spring washer 14 and keeper 15. The TVA system incorporates a partial disabling lifter 4 which is supported in engine block 31 in this pushrod engine design, and is discussed in detail in connection with FIG. 2, FIG. 3, and FIG. 4. This lifter may contain, as needed, an element to provide soft opening of valve 7 under partial lost motion operation. The TVA also includes an optional damper 8 which, if needed, provides a soft landing to valve 7 under partial lost motion operation. In overhead valve and overhead cam engines, the TVA replaces the valve lifter of that configuration.

In normal, warmed-up engine operation, the valve lifter 4 lifts the pushrod 5 causing the rocker arm 6 to rotate thus opening valve 7. For cold starting and perhaps other selected light load, low speed conditions; the TVA system comes into play. With the TVA system, valve lifter 4 is partially disabled so that it only partially lifts the pushrod 5. As valve motion is about to begin or end, the optional dampers 8 and in lifter 4 provide a smooth, quiet start and end to the valve motion.

Lubricating oil passage 17 provides lubrication to lifter 4 and actuating oil passage 18, in the present embodiment, provides an oil pressure control signal to change the lifter operating mode. An alternative embodiment is to combine the functionality of the oil passages 17, 18 such that lubricating oil and the actuation signal, based on a change in oil pressure, is supplied through one oil passage.

FIG. 2 shows the internal construction of a type of valve lifter 27 upon which the partial disabling lifter 4 in FIG. 1 is based. This lifter 27 is similar to the General Motors Displacement on Demand (DOD) production lifter. When modified, the DOD lifter shown as lifter 4 in FIG. 1 is one element of the TVA system. Lifter 27 includes roller 21, lifter body 22, deactivation pin assembly 23, plunger assembly 24, pin housing 20, pushrod seat assembly 19, spring seat 25, lost motion spring 26, and spring tower 29. The entire assembly 4 is housed within the engine block 31 for this pushrod engine design.

Pin assembly 23 is housed within plunger assembly 24. Pin assembly 23 locks plunger assembly 24 to lifter body 22 only when the pins 30 housed within pin assembly 23 are deployed. With the pins deployed, the plunger assembly 24 and lifter body 22 move together according to the lift provided by the cam 3, thus moving the pushrod seat assembly 19 which then through the pushrod and rocker mechanism move the valve.

In operation, roller 21 bears on the cam lobe 3 and transmits cam motion through bearing 28 and axle 32 which is rigidly attached to lifter body 22. When the pins 30 in pin assembly 23 are withdrawn, the plunger assembly 24 moves along the sliding interface 35 with the motion imparted by the cam, but does not raise the plunger assembly 24, and no motion is imparted to the valve. When the pins 30 are deployed, the entire valve lifter 4 is moved by the cam to open and close the valve 7 in the normal manner of a conventional valve lifter.

In the present invention it is the intent to provide a higher effective compression ratio for starting and other selected conditions thus allowing a lower engine design compression ratio. Some criteria and means are required to cause movement of latching pins 30 to cause this to occur at the proper time. In FIG. 2, the pins 30 are activated by a change in oil pressure in actuating passage 18, similar to the GM DOD system. However other methods can be used. An example of a different, passive means to move pins 30 is a bi-metal spring which could bear on the pins to move them. When the engine and engine oil are cold, the bi-metal spring would cause pins 30 to be withdrawn, thus changing the effective compression ratio by allowing lost motion of the lifter. As the engine and oil warm, the bi-metal spring inserts the pins into lifter body 22 in a rapid, snap action manner. No further movement of pins 30 occur until the engine and oil cool below a prescribed set temperature at which condition the pins 30 retract and lost motion ensues.

The above description of moving the pins by a bi-metal spring is a passive means. Active means are also envisioned in addition to the change in oil pressure design of the GM system. This could be electro-magnetic activation, thermal expansion, or other active means which could be computer controlled. For active means, a computer program would provide optimum control based on temperature, emissions, engine rotational speed and load, noise and engine smoothness; and tailored to each engine and application to provide optimal valve lift and timing.

Figure 3:
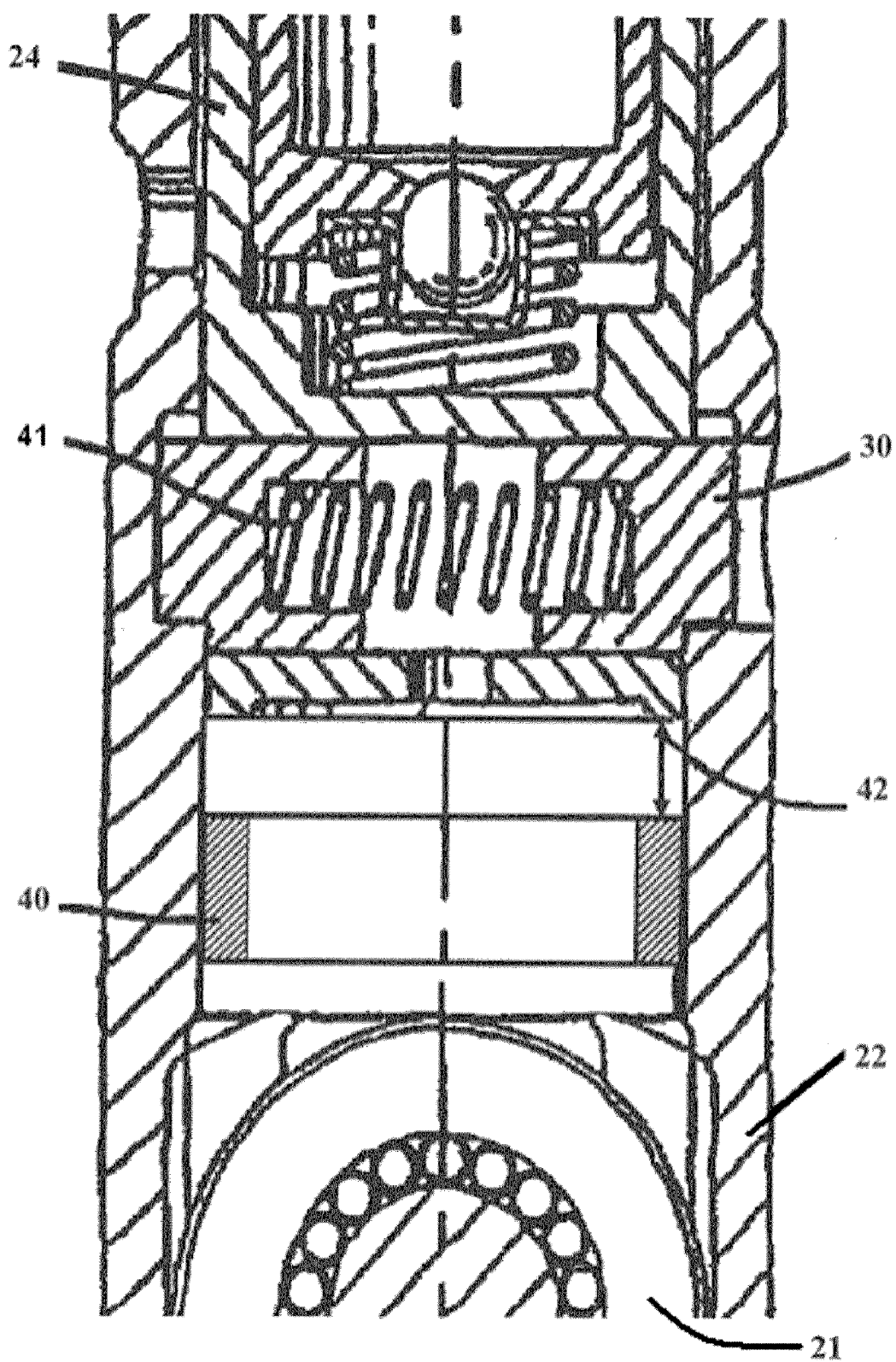
FIG. 3 is one embodiment of the modifications to the DOD lifter to make the TVA lifter.

FIG. 3 shows a section of the valve lifter in FIG. 2. For the present invention a two mode stop 40 is placed within lifter body 22. When the latching pins 30 are withdrawn and the plunger assembly 24 slides relative to the lifter body 22, the result is a partial lift of the valve 7 resulting in lost motion of an amount 42 determined by the position of the two mode lifter stop 40. The two mode lifter stop 40 is shown to be rigidly fixed to lifter body 22, however by means of an adjuster mechanism (not shown) the two mode lifter stop 40 could be repositioned to change the lost motion amount 42.

In the present invention it is the intent to provide a higher effective compression ratio for cold starting and warming the engine and/or causing more exhaust to be retained in the cylinder thus allowing a lower engine design compression ratio. Some criteria and means are required to cause movement of latching pins 30. As an example of one means, bi-metal spring 41 is shown. When the engine and engine oil are cold, the bi-metal spring 41 causes pins 30 to be withdrawn, thus allowing the lost motion amount 42. As the engine and oil warm, the bi-metal spring 41 inserts the pins into lifter body 22 in a rapid, snap action manner. No further movement of pins 30 occur until the engine and oil cool below a prescribed set temperature at which condition the pins 30 retract and lost motion ensues.

The above description of moving the pins 30 by a bi-metal spring is a passive means. Active means are also envisioned such as oil pressure change, electro-magnetic activation, thermal expansion, or other active means which could be computer controlled.

Figure 4:
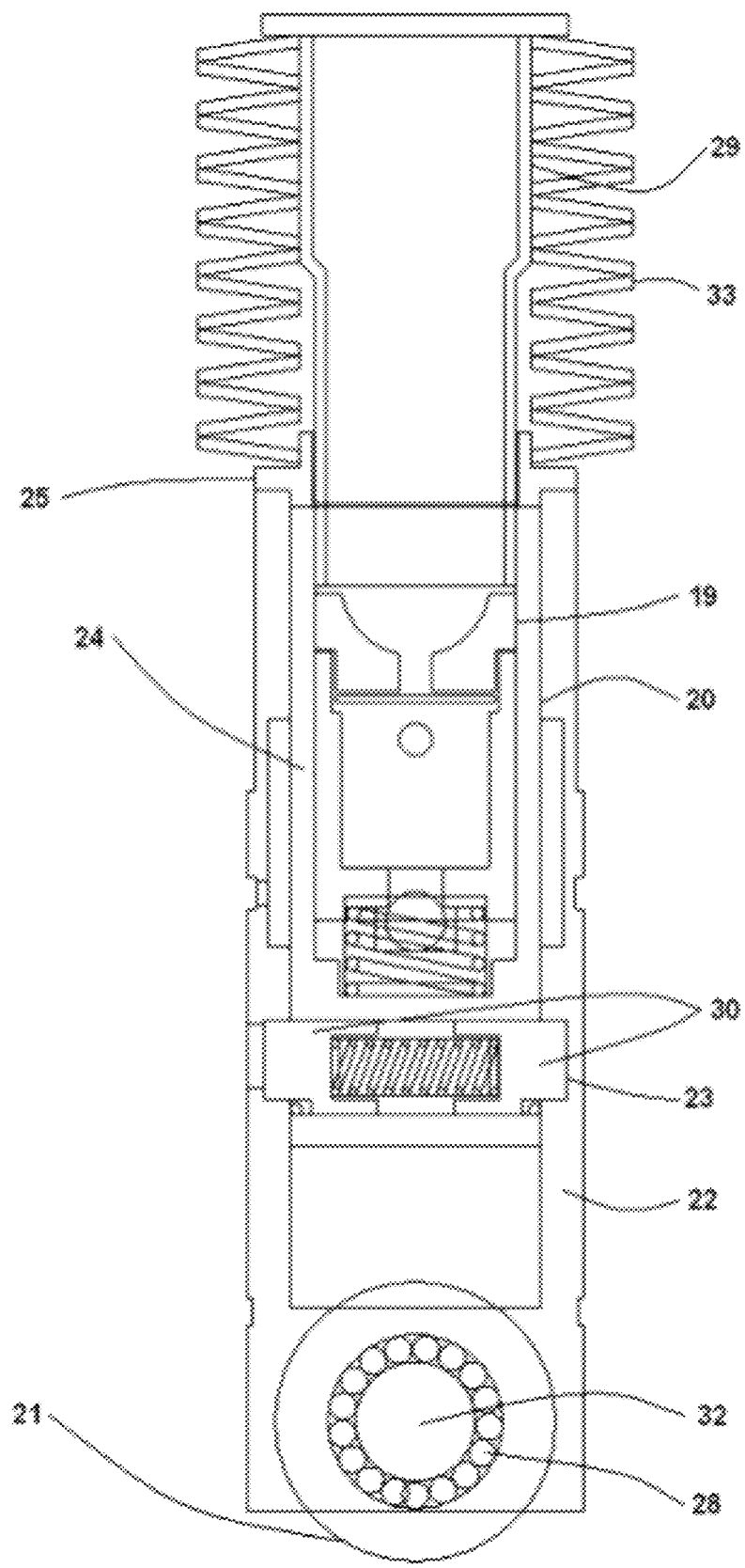
FIG. 4 shows a second embodiment of modifications to the DOD lifter to make the TVA lifter.

FIG. 4 shows a version of the TVA 4 which has a disc spring stack 33 in place of the coil spring 26. In this embodiment the two mode lifter stop 40 is eliminated and the disc spring stack, when the plunger assembly 24 is unlocked, compresses to the point where it can support the force required to partially compress the valve springs 12, 13 to partially lift the valve 7. The high, non-linear spring rate and friction damping from the springs rubbing together provide beneficial dynamic characteristics that limit shock and noise at the ramps 50.

Figure 5:
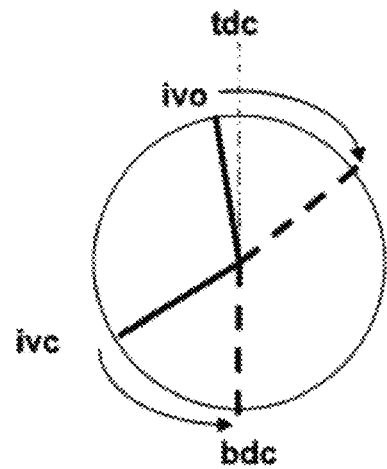
FIG. 5 shows a typical valve timing diagram and the changes imparted by the TVA system.

FIG. 5 shows the effect of the present invention on the intake valve timing. Ivo is the engine design intake valve opening and ivc the design closing angle (solid lines). Top dead center (tdc) and bottom dead center (bdc) are indicated. The two mode lifter causes the ivo and ivc to move according to the arrows into the dashed line positions. As shown the modified ivc is near bdc.

Figure 6:
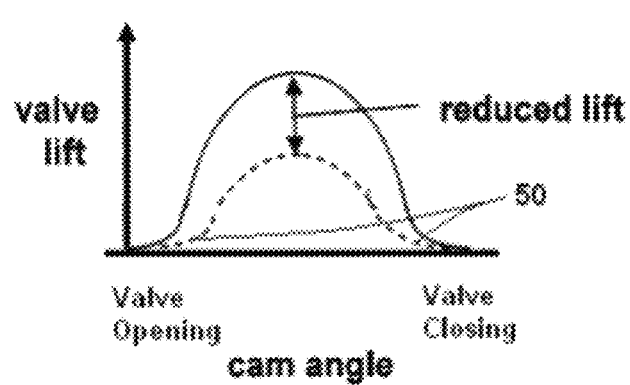
FIG. 6 shows the normal valve lift and the reduced lift imparted by TVA system when the optional damping is employed.

FIG. 6 shows the valve lift provided by the TVA system. Normal lift starts earlier and ends later, providing the usual valve lift of opening the valve before top center and closing after bottom center piston position (solid line). The lower dashed curve shows the action of the two mode lifter. Lost motion allows later opening and earlier intake valve closing, thus raising the effective engine compression ratio. In FIG. 6, the effective compression ratio is raised to the engine design ratio by closing the intake valve 7 near bottom dead center, bdc, although a lesser compression ratio increase is possible based on the location of the two mode lifter stop 40 or the strength of the spring stack 33. The gradual ramps 50 in the partially deactivated mode are provided by the optional dampers 8 and within lifter 4. The maximum lift with the TVA activated is lower than the design lift and the difference is indicated by the arrow marked reduced lift. Lower lift does not reduce the filling of the cylinder under the low speed conditions where the TVA is employed. A similar diagram (not shown) applies to the exhaust valve with the TVA lifter. In the partial lift mode the exhaust valve would open near bottom center and close about 10 to 20 degrees before top center.

Figure 7:
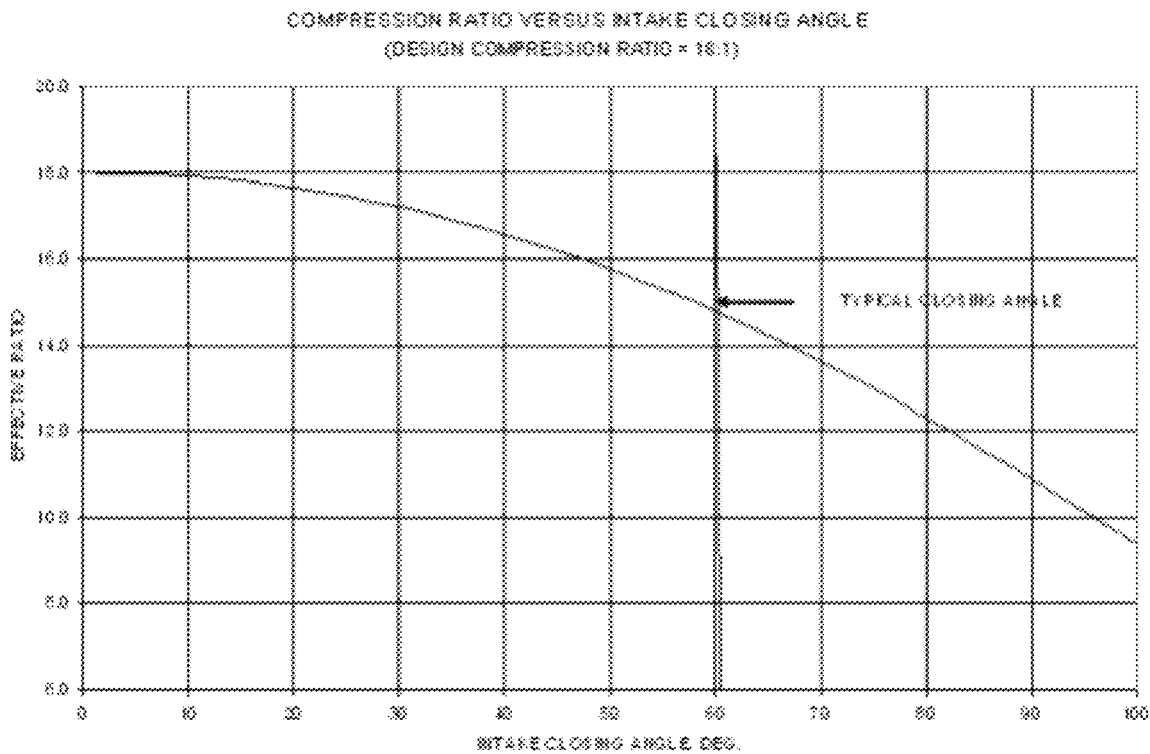
FIG. 7 shows the effective compression ratio for various intake valve closing angles for an engine with a design compression ratio of 18:1.

FIG. 7 shows, as an example, the effective compression ratio with various intake valve closing angles for a Diesel engine with a design compression ratio of 18:1. Many engines have intake valve closing 60 degrees after bottom center as the line labeled TYPICAL CLOSING ANGLE indicates. For this condition, the effective compression ratio is slightly below 15:1 for a design compression ratio of 18:1. Using the two mode valve lifter mechanism, the design compression ratio could be reduced, possibly as low as 15:1 without loss of cold start capability.

For the purposes of this disclosure, an engine which utilizes the Miller Cycle is an internal-combustion engine as defined in U.S. Pat. No. 2,400,247. U.S. Pat. No. 2,400,247 is herein incorporated by reference in its entirety.

For the purposes of this disclosure, a flat follower is a flat faced companion to the camshaft that transfers the motion of the camshaft lobe to the lifter body by sliding on the cam lobe.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

We claim:

1. A two-mode valve actuator system for reducing valve lift and closing the valve at an earlier crank angle of a Diesel engine during cold starting and warm-up conditions, the system comprising:
    a partially disabling lifter which is supported in an engine block or head of the engine, the lifter comprising;
        a roller or flat follower which is actuated by a cam lobe of the engine;
        a lifter body which is functionally attached to the roller or flat follower;
        a plunger assembly;
        means to functionally allow telescoping motion between the lifter body and the plunger assembly, reduce valve lift, and close the valve at an earlier crank angle during engine cold starting and warm-up conditions;
        a pushrod seat assembly which is functionally attached to the plunger assembly;
        a spring seat which is functionally attached to the lifter body;
        a spring tower which is rigidly attached to the plunger assembly;

a seat assembly which is functionally attached to the lifter body of the Diesel engine, wherein the Diesel engine is a pushrod engine, or a solid surface on top of the spring tower which is functionally attached to a Diesel engine rocker, wherein the Diesel engine is a non-pushrod engine; and a lost motion spring which is functionally attached to the spring tower; and means to provide soft opening of an engine valve in the engine that the partially disabling lifter actuates.

2. The system of claim 1, wherein the means to functionally allow telescoping motion between the lifter body and the plunger assembly, reduce valve lift, and close the valve at an earlier crank angle during engine cold starting and warm-up conditions comprise: a deactivation pin assembly which contains pins within a pin housing and is functionally attached to the lifter body.

3. The system of claim 1, wherein the means to functionally allow telescoping motion between the lifter body and the plunger assembly, reduce valve lift, and close the valve at an earlier crank angle during engine cold starting and warm-up conditions comprise: a magnetic latching mechanism.

4. The system of claim 1, wherein the means to functionally allow telescoping motion between the lifter body and the plunger assembly, reduce valve lift, and close the valve at an earlier crank angle during engine cold starting and warm-up conditions comprise: a thermal expansion mechanism.

5. The system of claim 1, wherein the means to functionally allow telescoping motion between the lifter body and the plunger assembly, reduce valve lift, and close the valve at an earlier crank angle during engine cold starting and warm-up conditions is activated with a passive bi-metal spring.

6. The system of claim 1, wherein the means to functionally allow telescoping motion between the lifter body and the plunger assembly, reduce valve lift, and close the valve at an earlier crank angle during engine cold starting and warm-up conditions is activated with an oil pressure change.

7. The system of claim 1, wherein the means to functionally allow telescoping motion between the lifter body and the plunger assembly, reduce valve lift, and close the valve at an earlier crank angle during engine cold starting and warm-up conditions is activated with an electromagnetic mechanism.

8. The system of claim 1, further comprising means to dampen the closing of the engine valve that the partially disabling lifter actuates.

9. The system of claim 8, wherein the means to functionally allow telescoping motion between the lifter body and the plunger assembly, reduce valve lift, and close the valve at an earlier crank angle during engine cold starting and warm-up conditions comprise: a deactivation pin assembly which contains pins within a pin housing and is functionally attached to the lifter body.

10. The system of claim 8, wherein the means to functionally allow telescoping motion between the lifter body and the plunger assembly, reduce valve lift, and close the valve at an earlier crank angle during engine cold starting and warm-up conditions comprise: a magnetic latching mechanism.

11. The system of claim 8, wherein the means to functionally allow telescoping motion between the lifter body and the plunger assembly, reduce valve lift, and close the valve at an earlier crank angle during engine cold starting and warm-up conditions comprise: a thermal expansion mechanism.

12. The system of claim 8, wherein the means to functionally allow telescoping motion between the lifter body and the plunger assembly, reduce valve lift, and close the valve at an earlier crank angle during engine cold starting and warm-up conditions is activated with a passive bi-metal spring.

13. The system of claim 8, wherein the means to functionally allow telescoping motion between the lifter body and the plunger assembly, reduce valve lift, and close the valve at an earlier crank angle during engine cold starting and warm-up conditions is activated with an oil pressure change.

14. The system of claim 8, wherein the means to functionally allow telescoping motion between the lifter body and the plunger assembly, reduce valve lift, and close the valve at an earlier crank angle during engine cold starting and warm-up conditions is activated with an electromagnetic mechanism.

15. The system of claim 1, wherein the system facilitates the use of the Miller Cycle.

16. The system of claim 1, wherein the system activates the intake valve, exhaust valve, or both the intake valve and exhaust valve.

* * * * *